US012754366B2

(12) United States Patent
Bian et al.

(10) Patent No.: US 12,754,366 B2
(45) Date of Patent: Oct. 6, 2026

(54) PHOTONIC STRUCTURES WITH ONE OR MORE NOTCHED SIDE EDGES

(71) Applicants: GlobalFoundries U.S. Inc., Malta, NY (US); Vanderbilt University, Nashville, TN (US)

(72) Inventors: Yusheng Bian, Ballston Lake, NY (US); Abdelsalam Aboketaf, Essex Junction, VT (US); Takako Hirokawa, Ballston Lake, NY (US); Kellen Arnold, Nashville, TN (US); Sharon Weiss, Nashville, TN (US)

(73) Assignees: GlobalFoundries U.S. Inc., Malta, NY (US); Vanderbilt University, Nashville, TN (US)

( * ) Notice: Subject to any disclaimer, the term of this patent is extended or adjusted under 35 U.S.C. 154(b) by 300 days.

(21) Appl. No.: 18/640,703

(22) Filed: Apr. 19, 2024

(65) Prior Publication Data

US 2025/0327970 A1 Oct. 23, 2025

(51) Int. Cl.
*G02B 6/12* (2006.01)
*G02B 6/13* (2006.01)
*G02B 6/293* (2006.01)

(52) U.S. Cl.
CPC ........... *G02B 6/12007* (2013.01); *G02B 6/13* (2013.01); *G02B 6/29338* (2013.01)

(58) Field of Classification Search
CPC .............................. G02B 6/12007; G02B 6/13
See application file for complete search history.

(56) References Cited

U.S. PATENT DOCUMENTS

2025/0224560 A1* 7/2025 Bian ........................ G02B 6/13

OTHER PUBLICATIONS

Lu, Xiyuan et al., "Rod and slit photonic crystal microrings for on-chip cavity quantum electrodynamics" Nanophotonics, vol. 12, No. 3, 2023, pp. 521-529. https://doi.org/10.1515/nanoph-2022-0622.

Sasi Mudumba et al., "Photonic ring resonance is a versatile platform for performing multiplex immunoassays in real time." Journal of Immunological Methods, vol. 448, 2017, pp. 34-43, ISSN 0022-1759, https://doi.org/10.1016/j.jim.2017.05.005.

Gao, G., Zhang, Y., Zhang, H. et al., "Air-mode photonic crystal ring resonator on silicon-on-insulator." Scientific Reports 6, 19999 (2016). https://doi.org/10.1038/srep19999.

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611, doi: 10.1109/JSTQE.2019.2908790.

(Continued)

*Primary Examiner* — Michael P Mooney
(74) *Attorney, Agent, or Firm* — Thompson Hine LLP; Anthony Canale

(57) ABSTRACT

Structures for a photonic chip that include photonic device, such as a ring resonator, and methods of forming such structures. The structure comprises a waveguide core including a first section and a second section separated from the first section by a slot. The first section of the waveguide core includes a first side edge, a second side edge opposite from the first side edge, and a plurality of notches in the first side edge.

20 Claims, 3 Drawing Sheets

(56) References Cited

OTHER PUBLICATIONS

M. Rakowski et al., "45nm CMOS—Silicon Photonics Monolithic Technology (45CLO) for next-generation, low power and high speed optical interconnects," in Optical Fiber Communication Conference (OFC) 2020, OSA Technical Digest (Optica Publishing Group, 2020), paper T3H.3.

Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optica Publishing Group, 2020), paper FW5D.2.

Y. Bian et al., "Hybrid III-V laser integration on a monolithic silicon photonic platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper M5A.2.

Y. Bian et al., "3D Integrated Laser Attach Technology on 300-mm Monolithic Silicon Photonics Platform," 2020 IEEE Photonics Conference (IPC), 2020, pp. 1-2, doi: 10.1109/IPC47351.2020.9252280.

B. Peng et al., "A Cmos Compatible Monolithic Fiber Attach Solution with Reliable Performance and Self-alignment," in Optical Fiber Communication Conference (OFC) 2020, OSA Technical Digest (Optica Publishing Group, 2020), paper Th31.4.

Y. Bian et al., "Monolithically integrated silicon nitride platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper Th1A.46.

T. Letavic et al., "Monolithic Silicon Photonics," 2023 IEEE BiCMOS and Compound Semiconductor Integrated Circuits and Technology Symposium (BCICTS), Monterey, CA, USA, 2023, pp. 263-269, doi: 10.1109/BCICTS54660.2023.10310983.

Y. Bian et al., "Monolithically integrated self-aligned SiN edge coupler with <0.6/0.8 dB TE/TM insertion loss, <-39 dB back reflection and >520 mW high-power handling capability," in Optical Fiber Communication Conference (OFC) 2023, Technical Digest Series (Optica Publishing Group, 2023), paper M3C.3.

Y. Bian et al., "Polarization mode dispersion in CMOS-integrated monolithic SiPh components: simulations and experiments," 2023 Optical Fiber Communications Conference and Exhibition (OFC), San Diego, CA, USA, 2023, pp. 1-3, doi: 10.1364/OFC.2023.Th2A.24.

Y. Bian et al., "Towards polarization insensitive photonic integrated circuits: polarization dependent loss reduction of CMOSintegrated monolithic SiPh components." OFC 2024, Optica Publishing Group 2024; pp. 1-3; M1J.4.

Won Suk Lee et al., "Low-loss and broadband adiabatic polarization splitter rotator on a CMOS-integrated silicon photonics platform." OFC 2024, Optica Publishing Group 2024; pp. 1-3; M1J.5.

Y. Bian et al., "Mitigating substrate leakage loss on a monolithic SiPh platform: experimental demonstration of hybrid Si—SiN waveguides for O-band datacom." OFC 2024, Optica Publishing Group 2024; pp. 1-3; Th3H.3.

Sujith Chandran et al., "High Performance Silicon Nitride Passive Optical Components on Monolithic Silicon Photonics Platform." OFC 2024, Optica Publishing Group 2024; pp. 1-3; Th3H.4.

Heming Hu et al., "Design of a high extinction ratio silicon optical modulator at 2 um using the cascaded compensation method," OSA Continuum 4, 1933-1944 (2021).

Folkert Horst et al., "Cascaded Mach-Zehnder wavelength filters in silicon photonics for low loss and flat pass-band WDM (de-)multiplexing," Optics Express 21, 11652-11658 (2013).

Y. Bian et al., "3D Integrated Laser Attach Technology on a 300-mm Monolithic CMOS Silicon Photonics Platform," in IEEE Journal of Selected Topics in Quantum Electronics, vol. 29, No. 3: Photon. Elec. Co-Inte. and Adv. Trans. Print., pp. 1-19, May-Jun. 2023, Art No. 8200519, doi: 10.1109/JSTQE.2023.3238290.

Shi, Bingyao et al., "Compact Slot Microring Resonator for Sensitive and Label-Free Optical Sensing" Sensors 22, No. 17: 6467. https://doi.org/10.3390/s22176467; 2022.

* cited by examiner

PHOTONIC STRUCTURES WITH ONE OR MORE NOTCHED SIDE EDGES

BACKGROUND

The disclosure relates to photonic chips and, more specifically, to structures for a photonic chip that include a photonic device, such as a ring resonator, and methods of forming such structures.

Photonic chips are used in many applications and systems including, but not limited to, data communication systems and data computation systems. A photonic chip includes a photonic integrated circuit comprised of photonic devices, such as modulators, polarizers, and optical couplers, that are used to manipulate light received from a light source, such as an optical fiber or a laser.

A ring resonator is a photonic device that is characterized by a circular waveguide core with a resonance condition in which specific wavelengths of light circulating in the circular waveguide core are captured. Specifically, wavelengths of light that are equal to the circumference of the circular waveguide core divided by an integer and multiplied by the refractive index of the surroundings are captured and resonate within the ring. Non-resonant wavelengths of light are free to be released from the ring resonator. The resonant wavelengths of light that are captured by the ring are observed as dips in the spectrum of light released from the ring resonator.

A photonic sensor may include a ring resonator as a sensing element. The presence of a material in the environment surrounding the ring resonator may interact with the evanescent field of the light circulating in the ring resonator and change the resonant wavelengths. The changes in the resonant wavelengths are manifested as shifts in the dips observed in the spectrum of light released from the ring resonator. A characteristic of the material may be sensed by interpreting the shifts in the dips.

Improved structures for a photonic chip that include a photonic device, such as a ring resonator, and methods of forming such structures are needed.

SUMMARY

In an embodiment of the invention, a structure for a photonic chip is provided. The structure comprises a waveguide core including a first section and a second section separated from the first section by a slot. The first section of the waveguide core includes a first side edge, a second side edge opposite from the first side edge, and a plurality of notches in the first side edge.

In an embodiment of the invention, a method of forming a structure for a photonic chip is provided. The method comprises forming a waveguide core including a first section and a second section separated from the first section by a slot. The first section of the waveguide core includes a first side edge, a second side edge opposite from the first side edge, and a plurality of notches in the first side edge.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
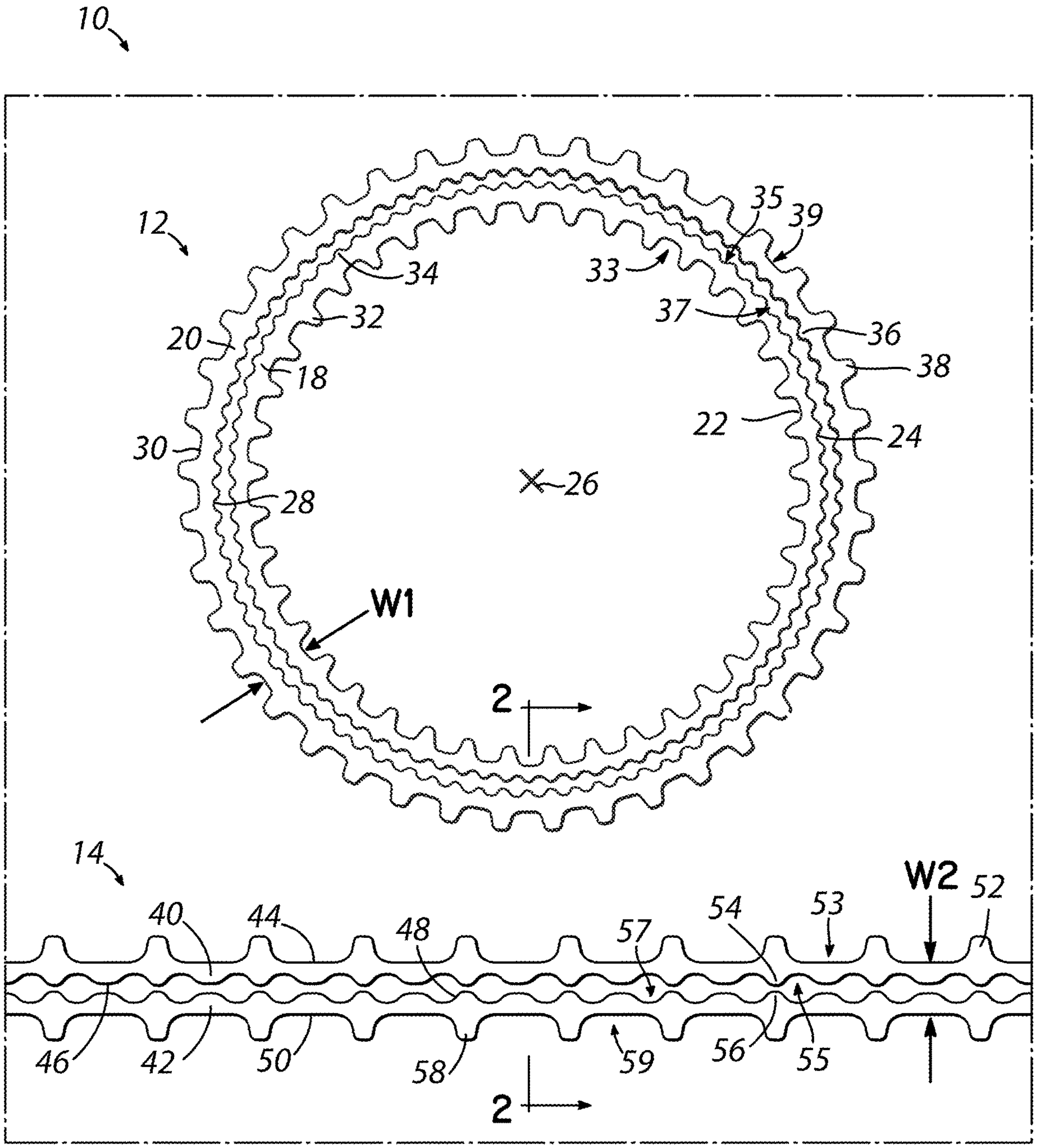
FIG. 1 is a top view of a structure at an initial fabrication stage of a processing method in accordance with embodiments of the invention.
Figure 2:
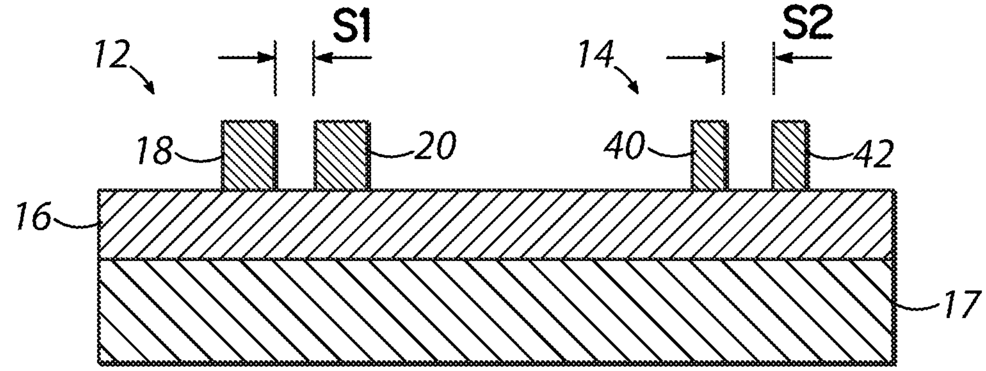
FIG. 2 is a cross-sectional view taken generally along line 2-2 in FIG. 1.

With reference to FIGS. 1, 2 and in accordance with embodiments of the invention, a structure 10 for a photonic chip includes a ring resonator 12 and a waveguide core 14 having a portion disposed adjacent to a portion of the ring resonator 12. The ring resonator 12 and a waveguide core 14 may be positioned over a dielectric layer 16. In an embodiment, the dielectric layer 16 may be comprised of a dielectric material, such as silicon dioxide, that is an electrical insulator. In an embodiment, the dielectric layer 16 may be a buried oxide layer of a silicon-on-insulator substrate, and the silicon-on-insulator substrate may further include a semiconductor substrate 17 comprised of a semiconductor material (e.g., single-crystal silicon) beneath the buried oxide layer.

In an embodiment, the ring resonator 12 may include an inner section 18 and an outer section 20 that surrounds the inner section 18. In an embodiment, the inner section 18 and the outer section 20 of the ring resonator 12 may be annular waveguide cores that are closed rings or loops, and the outer section 20 may encircle the inner section 18. The inner section 18 is bounded by an inner edge 22 and an outer edge 24 that are substantially circular. The outer section 20 is bounded by an inner edge 28 and an outer edge 30 that are substantially circular. The inner section 18 and the outer section 20 may be centered on a center 26 and therefore the inner section 18 and the outer section 20 may be concentric. The inner edge 28 of the outer section 20 is spaced outwardly from the outer edge 24 of the inner section 18 such that a slot S1 is formed therebetween as an open space having a non-linear envelope about the circumference of the ring resonator 12. In an embodiment, the inner edge 28 of the outer section 20 may have a larger radius than the outer edge 24 of the inner section 18 at any location about the circumference of the ring resonator 12.

The inner edge 22 of the inner section 18 of the ring resonator 12 is corrugated with a series of projections 32 that protrude inwardly toward the center 26. The projections 32 are distributed about the circumference of the inner edge 22. In an embodiment, the projections 32 may be distributed with uniform spacing or pitch about the circumference of the inner edge 22. Notches 33 are formed as indentations in the inner edge 22 and the notches 33 are distributed about the circumference of the inner edge 22. The notches 33 alternate along the inner edge 22 with the projections 32. In an embodiment, the projections 32 may be rounded and the notches 33 may be rounded recesses that are indented along the inner edge 22 between adjacent pairs of projections 32.

The outer edge 24 of the inner section 18 of the ring resonator 12 may include a series of projections 34 that project outwardly into the slot S1 between the sections 18, 20 and away from the center 26. The projections 34 are distributed about the circumference of the outer edge 24. In an embodiment, the projections 34 may be distributed with uniform spacing or pitch about the circumference of the outer edge 24. Notches 35 are formed as indentations in the outer edge 24 and the notches 35 are distributed about the circumference of the outer edge 24. The notches 35 alternate along the outer edge 24 with the projections 34. In an embodiment, the projections 34 may be rounded and the notches 35 may be rounded recesses that are indented along the outer edge 24 between adjacent pairs of projections 34.

The radius of the inner edge 22 varies with position about the circumference of the inner section 18, and the radius of the outer edge 24 varies with position about the circumference of the inner section 18. Consequently, the width of the inner section 18 varies with position about the circumference of the inner section 18. Each of the projections 32 may be correlated at an angular location about the circumference with one of the projections 34, and each of the notches 33 may be correlated at an angular location about the circumference with one of the projections 34. In an embodiment, the projections 34 may be shorter than the projections 32. In an embodiment, the projections 34 may have multiple lengths that are each shorter than the projections 32. In an embodiment, the projections 34 may be characterized by a different pitch from the projections 32. In an embodiment, the pitch of the projections 34 may be less than the pitch of the projections 32. In an embodiment, the pitch of the projections 34 may be one-half of the pitch of the projections 32.

The inner edge 28 of the outer section 20 of the ring resonator 12 may include a series of projections 36 that project inwardly into the slot S1 between the sections 18, 20 and toward the center 26. The projections 36 are distributed about the circumference of the inner edge 28. In an embodiment, the projections 36 may be distributed with uniform spacing or pitch about the circumference of the inner edge 28. Notches 37 are formed as indentations in the inner edge 28 and the notches 37 are distributed about the circumference of the inner edge 28. The notches 37 alternate along the inner edge 28 with the projections 36. In an embodiment, the projections 36 may be rounded and the notches 37 may be rounded recesses that are indented along the inner edge 28 between adjacent pairs of projections 36.

The outer edge 30 of the outer section 20 of the ring resonator 12 may include a series of projections 38 that project outwardly into the environment surrounding the ring resonator 12 and away from the center 26. The projections 38 are distributed about the circumference of the outer edge 30. In an embodiment, the projections 38 may be distributed with uniform spacing or pitch about the circumference of the outer edge 30. Notches 39 are formed as indentations in the outer edge 30 and the notches 39 are distributed about the circumference of the outer edge 30. The notches 39 alternate along the outer edge 30 with the projections 38. In an embodiment, the projections 38 may be rounded and the notches 39 may be rounded recesses that are indented along the outer edge 30 between adjacent pairs of projections 38.

The radius of the inner edge 28 varies with position about the circumference of the outer section 20, and the radius of the outer edge 30 varies with position about the circumference of the outer section 20. Consequently, the width of the outer section 20 varies with position about the circumference of the outer section 20. Each of the projections 38 may be correlated at an angular location about the circumference with one of the projections 36, and each of the notches 39 may be correlated at an angular location about the circumference with one of the projections 36. In an embodiment, the projections 36 may be shorter than the projections 38. In an embodiment, the projections 36 may have multiple lengths that are each shorter than the projections 38. In an embodiment, the projections 36 may be characterized by a different pitch from the projections 38. In an embodiment, the pitch of the projections 36 may be less than the pitch of the projections 38. In an embodiment, the pitch of the projections 36 may be one-half of the pitch of the projections 38.

The ring resonator 12 has a width W1 that varies with position around the circumference of the ring resonator 12. Each projection 36 may face one of the projections 34 across the slot S1, and each notch 35 may face one of the notches 37 across the slot S1. The width of the slot S1 between the outer edge 24 of the inner section 18 and the inner edge 28 of the outer section 20 of the ring resonator 12 varies with position about the circumference of the ring resonator 12. At a given position, the local width W1 of the ring resonator 12 is equal to the local width of the inner section 18, the local width of the outer section 20, and the local width of the slot S1. In an embodiment, the slot S1 may be filled by air. In an alternative embodiment, the slot S1 may be filled by a dielectric material, such as silicon dioxide.

In an alternative embodiment, the inner section 18 and the outer section 20 of the ring resonator 12 may have non-annular geometrical shapes. For example, the inner section 18 and the outer section 20 of the ring resonator 12 may be configured with oblong or racetrack shapes that incorporate the slot S1 therebetween.

The waveguide core 14 may include a section 40 and a section 42 that is disposed adjacent to the section 40. The section 40 of the waveguide core 14 includes an edge 44 and an edge 46 opposite from the edge 44. The section 42 of the waveguide core 14 includes an edge 48 and an edge 50 opposite from the edge 48. The edge 48 of the section 42 is spaced from the edge 46 of the section 40 by a slot S2 having a non-linear envelope.

The section 40 of the waveguide core 14 may include a series of projections 52 that project outwardly from the edge 44, and a series of projections 54 that project inwardly from the edge 46 into the slot S2. The projections 52 are distributed along the length of the edge 44, and the projections 54 are distributed along the length of the edge 46. In an embodiment, the projections 52 may be distributed with uniform spacing or pitch and the projections 54 may be distributed with uniform spacing or pitch. Notches 53 are formed as indentations in the edge 44 and notches 55 are formed as indentations in the edge 46. The notches 53 alternate along the length of the edge 44 with the projections 52 and the notches 55 alternate along the length of the edge 46 with the projections 54. In an embodiment, the projections 52 may be rounded and the notches 53 may be rounded recesses that are indented along the edge 44 between adjacent pairs of projections 52. In an embodiment, the projections 54 may be rounded and the notches 55 may be rounded recesses that are indented along the edge 46 between adjacent pairs of projections 54. In an embodiment, the projections 54 may be shorter than the projections 52.

The width of the section 40 varies with position along the length of the section 40. Each of the projections 54 may be correlated at a location along the length of the section 40 with one of the projections 52, and each of the notches 53 may be correlated at a position along the length of the section 40 with one of the projections 54. In an embodiment, the projections 54 may be characterized by a different pitch from the projections 52. In an embodiment, the pitch of the projections 54 may be less than the pitch of the projections 52. In an embodiment, the pitch of the projections 54 may be one-half of the pitch of the projections 52.

The section 42 of the waveguide core 14 may include a series of projections 56 that project inwardly from the edge 48 into the slot S2, and a series of projections 58 that project outwardly from the edge 50. The projections 56 are distributed along the length of the edge 48, and the projections 58 are distributed along the length of the edge 50. In an embodiment, the projections 56 may be distributed with uniform spacing or pitch and the projections 58 may be distributed with uniform spacing or pitch. Notches 57 are formed as indentations in the edge 48 and notches 59 are formed as indentations in the edge 50. The notches 57 alternate along the length of the edge 48 with the projections 56 and the notches 59 alternate along the length of the edge 50 with the projections 58. In an embodiment, the projections 56 may be rounded and the notches 57 may be rounded recesses that are indented along the edge 48 between adjacent pairs of projections 56. In an embodiment, the projections 58 may be rounded and the notches 59 may be rounded recesses that are indented along the edge 50 between adjacent pairs of projections 58. In an embodiment, the projections 56 may be shorter than the projections 58.

The width of the section 42 varies with position along the length of the section 42. Each of the projections 58 may be correlated at a location along the length of the section 42 with one of the projections 56, and each of the notches 59 may be correlated along the length of the section 42 with one of the projections 56. In an embodiment, the projections 58 may be characterized by a different pitch from the projections 56. In an embodiment, the pitch of the projections 56 may be less than the pitch of the projections 58. In an embodiment, the pitch of the projections 56 may be one-half of the pitch of the projections 58.

The waveguide core 14 has a width W2 that varies with position along the length of the waveguide core 14. Each projection 56 may face one of the projections 54 across the slot S2, and each notch 55 may face one of the notches 57 across the slot S2. The width of the slot S2 between the edge 46 of the section 40 and the edge 48 of the section 42 of the waveguide core 14 varies with position along the length of the waveguide core 14. At a given position, the local width W2 of the waveguide core 14 is equal to the local width of the section 40, the local width of the section 42, and the local width of the slot S2. In an embodiment, the slot S2 may be filled by air. In an alternative embodiment, the slot S2 may be filled by a dielectric material, such as silicon dioxide.

In an embodiment, the ring resonator 12 and the waveguide core 14 may be comprised of a semiconductor material, such as single-crystal silicon. In an embodiment, the ring resonator 12 and the waveguide core 14 may be concurrently formed by patterning a single-crystal silicon device layer of a silicon-on-insulator substrate with lithography and etching processes. In an alternative embodiment, the ring resonator 12 and the waveguide core 14 may be comprised of a dielectric material, such as silicon nitride, silicon oxynitride, or aluminum nitride. In an alternative embodiment, the ring resonator 12 and the waveguide core 14 may be comprised of a different semiconductor material, such as polysilicon or amorphous silicon. In alternative embodiments, other materials, such as a III-V compound semiconductor, may be used to form the ring resonator 12 and the waveguide core 14. The patterned shapes of the sections 18, 20 of the ring resonator 12 and the shapes of the section 40, 42 of the waveguide core 14 may be generated through a traditional design methodology, by an inverse design method, or using another optimization algorithm.

In use, light may be coupled between the waveguide core 14 and the ring resonator 12 over a coupling region of closest proximity between the sections 40, 42 of the waveguide core 14 and the sections 18, 20 of the ring resonator 12. The structure 10 may function as a sensor detecting the interaction between the evanescent field of the light circulating in the ring resonator 12 and a material adjacent to the exterior surfaces of the ring resonator 12. For example, the material may be comprised of a liquid or fluid biological analyte that may contact and/or may be bound to the exterior surfaces of the ring resonator 12. The presence of the material in proximity to the ring resonator 12 causes changes in the resonant wavelengths of the ring resonator 12, which may be observed as dips in the spectrum of light released from the ring resonator 12 and captured by the waveguide core 14. A characteristic of the material may be sensed by interpreting the shifts in the dips.

The ring resonator 12 and the waveguide core 14 of the structure 10 provide photonic devices that may be utilized as a sensor in a photonic chip. For example, the sensor may be used as a biosensor for sensing a specific biological analyte. The structure 10 may improve the performance metrics for a sensor incorporating the ring resonator 12, such as providing an improved sensitivity when the structure 10 is functioning as a biosensor.

Figure 3:
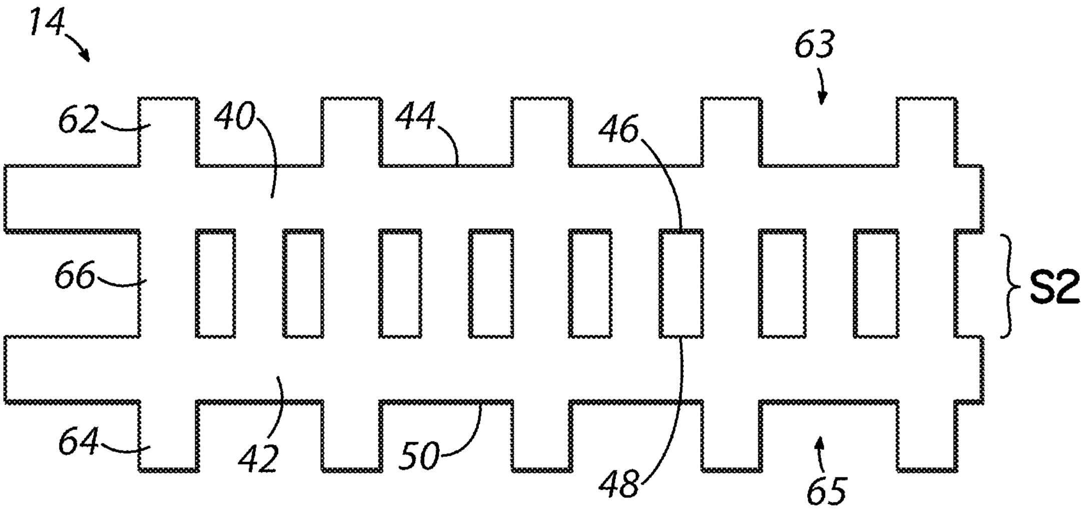
FIG. 3 is a top view of a portion of a structure in accordance with alternative embodiments of the invention.

With reference to FIG. 3 and in accordance with alternative embodiments, the section 40 of the waveguide core 14 may be modified to include projections 62 that project outwardly from the edge 44, projections 64 that project outwardly from the edge 50, and bars 66 that extend fully across the slot S2 from the edge 46 to the edge 48. The bars 66 divide the slot S2 into multiple openings and each opening may be disposed between an adjacent pair of the bars 66. In an embodiment, the bars 66 may have a uniform spacing or pitch. In an alternative embodiment, the bars 66 may have a spacing or pitch with a pattern that repeats along the length of the sections 40, 42 of the waveguide core 14. In an embodiment, the projections 62 may be characterized by the same pitch as the projections 64, and the bars 66 may be characterized by a pitch that is less than the pitch of the projections 62 and less than the pitch of the projections 64. In an alternative embodiment, the bars 66 may have a spacing or pitch that is one-half of the pitch of the projections 62 and/or the projections 64. In an embodiment, the bars 66 may have a non-uniform spacing or pitch that varies with position along the length of the sections 40, 42 of the waveguide core 14. In an embodiment, the bars 66 may have a uniform width. In an alternative embodiment, the bars 66 may have a non-uniform width that varies with position along the length of the sections 40, 42 of the waveguide core 14. In an alternative embodiment, the bars 66 may have a set of widths arranged in a pattern that repeats along the length of the sections 40, 42 of the waveguide core 14.

Notches 63 are formed as indentations in the edge 44 between adjacent pairs of projections 62 and are distributed along the length of the edge 44. The notches 63 alternate along the length of the edge 44 with the projections 62. In an embodiment, the projections 62 may be rectangular, and the notches 63 may be rectangular recesses that are indented along the edge 44 between adjacent pairs of projections 62. Notches 65 are formed as indentations in the edge 50 between adjacent pairs of projections 64 and are distributed along the length of the edge 50. The notches 65 alternate along the length of the edge 50 with the projections 64. In an embodiment, the projections 64 may be rectangular, and the notches 65 may be rectangular recesses that are indented along the edge 50 between adjacent pairs of projections 64.

In an embodiment, the projections 62 may project from the edge 44 by a uniform distance such that the notches 63 have a uniform depth. In an embodiment, the projections 62 may project from the edge 44 by different distances. In an embodiment, the projections 64 may project from the edge 50 by a uniform distance such that the notches 65 have a uniform depth. In an embodiment, the projections 64 may project from the edge 50 by different distances.

In an embodiment, each of the projections 62 may be correlated at a location along the length of the section 40 with one of the bars 66, and each of the notches 63 may be correlated at a location along the length of the section 40 with one of the bars 66. In an embodiment, each of the projections 64 may be correlated at a location along the length of the section 42 with one of the bars 66, and each of the notches 65 may be correlated at a location along the length of the section 42 with one of the bars 66.

In an embodiment, the inner section 18 and the outer section 20 of the ring resonator 12 may be modified in the same manner as the sections 40, 42 of the waveguide core 14 to include projections 62, 64 and bars 66 extending across the slot S1.

Figure 4:
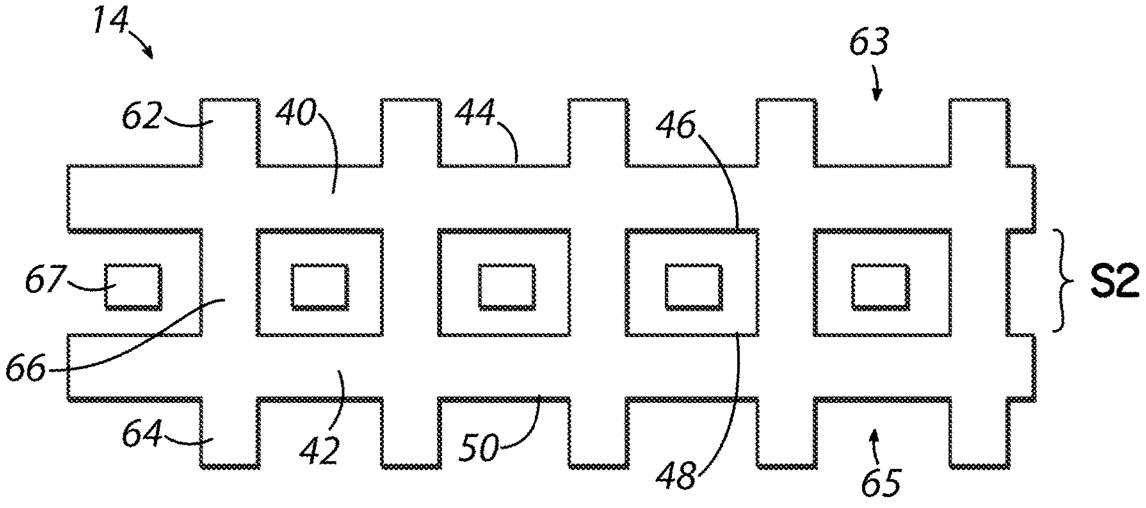
FIG. 4 is a top view of a portion of a structure in accordance with alternative embodiments of the invention.

With reference to FIG. 4 and in accordance with alternative embodiments, the waveguide core 14 may be modified to include bars 67 that are shorter than the bars 66 and that have a length that is less than the width of the slot S2. The bars 67, which alternate along the length of the waveguide core 14 with the bars 66, may be disposed as islands within the slot S2. For example, the bars 67 may be centrally located in the slot S2. The bars 67 are outwardly displaced and disconnected from the edge 46 of the section 40 of the waveguide core 14 and the bars 67 are outwardly displaced and disconnected from the edge 48 of the section 42 of the waveguide core 14.

In an embodiment, the inner section 18 and the outer section 20 of the ring resonator 12 may be modified in the same manner as the sections 40, 42 of the waveguide core 14 to include projections 62, 64 and bars 66, as well as bars 67 that are disposed inside the slot S1.

Figure 5:
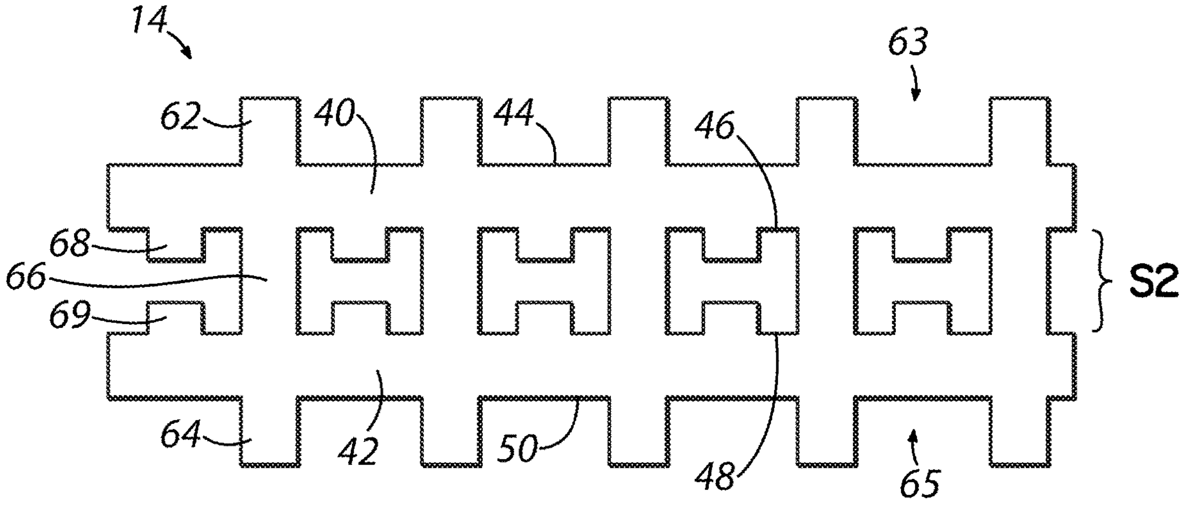
FIG. 5 is a top view of a portion of a structure in accordance with alternative embodiments of the invention.

With reference to FIG. 5 and in accordance with alternative embodiments, the waveguide core 14 may be modified to include bars 68 that are shorter than the bars 66 and bars 69 that are also shorter than the bars 66. The bars 68, which adjoin and project from the edge 46 of the section 40 of the waveguide core 14, have a length that is less than the width of the slot S2 and extend partially across the width of the slot S2. The bars 69, which adjoin and project from the edge 48 of the section 42 of the waveguide core 14, also have a length that is less than the width of the slot S2 and extend partially across the width of the slot S2. The bars 68 and the bars 69 may be arranged in facing pairs, and the facing pairs of bars 68, 69 may alternate along the length of the waveguide core 14 with the bars 66. At the location of each pair of bars 68, 69, the slot S2 may be locally narrowed at locations between facing pairs of the bars 66, 68.

In an embodiment, the inner section 18 and the outer section 20 of the ring resonator 12 may be modified in the same manner as the sections 40, 42 of the waveguide core 14 to include projections 62, 64 and the bars 66, as well as the bars 68, 69 disposed inside the slot S1.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value or precise condition as specified. In embodiments, language of approximation may indicate a range of +/−10% of the stated value(s) or the stated condition(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction in the frame of reference perpendicular to the horizontal plane, as just defined. The term "lateral" refers to a direction in the frame of reference within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features may "overlap" if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for a photonic device, the structure comprising:

a waveguide core including a first section and a second section separated from the first section by a slot, the first section of the waveguide core including a first side edge, a second side edge opposite from the first side edge, a first plurality of notches in the first side edge, and a second plurality of notches in the second side edge.

2. The structure of claim 1 wherein the first side edge borders the slot.

3. The structure of claim 1 wherein the second side edge borders the slot.

4. The structure of claim 1 wherein the first side edge includes a first plurality of projections, and the first plurality of notches alternate with the first plurality of projections along the second side edge.

5. The structure of claim 4 wherein the second side edge includes a second plurality of projections, and the second plurality of notches alternate with the second plurality of projections along the second side edge.

6. The structure of claim 5 wherein the first side edge borders the slot, the first plurality of projections have a first pitch along the first side edge, the second plurality of projections have a second pitch along the second side edge, and the first pitch is less than the second pitch.

7. The structure of claim 4 wherein the second section includes a third side edge, a fourth side edge opposite from the third side edge, and a third plurality of notches in the third side edge.

8. The structure of claim 7 wherein the second section includes a fourth plurality of notches in the fourth side edge.

9. The structure of claim 1 wherein the second section includes a third side edge, a fourth side edge opposite from the third side edge, and a third plurality of notches in the third side edge.

10. The structure of claim 9 wherein the third side edge borders the slot.

11. The structure of claim 9 wherein the fourth side edge borders the slot.

12. The structure of claim 1 wherein the second side edge borders the slot, the second section includes a third side edge bordering the slot, and the waveguide core includes a plurality of bars that extend fully across the slot from the second side edge to the third side edge.

13. The structure of claim 1 wherein the second side edge borders the slot, and the waveguide core includes a plurality of bars that extend from the second side edge partially across the slot.

14. The structure of claim 1 wherein the second side edge borders the slot, the second section includes a third side edge bordering the slot, and the waveguide core includes a plurality of bars disposed in the slot between the second side edge and the third side edge.

15. The structure of claim 1 wherein the first side edge includes a plurality of projections, the first plurality of notches alternate with the plurality of projections, and each projection is rounded.

16. The structure of claim 1 wherein the first section of the waveguide core is a first annulus, and the second section of the waveguide core is a second annulus that is concentric with the first annulus.

17. The structure of claim 16 wherein the first side edge borders the slot.

18. The structure of claim 16 wherein the second side edge borders the slot.

19. A method of forming a structure for a photonic device, the method comprising:

forming a waveguide core including a first section and a second section separated from the first section by a slot, wherein the first section of the waveguide core includes a first side edge, a second side edge opposite from the first side edge, a plurality of notches in the first side edge, and a second plurality of notches in the second side edge.

20. The structure of claim 1 wherein the waveguide core comprises a semiconductor material.

* * * * *